(12) United States Patent
Shen et al.

(10) Patent No.: US 8,140,828 B2
(45) Date of Patent: Mar. 20, 2012

(54) HANDLING TRANSACTION BUFFER OVERFLOW IN MULTIPROCESSOR BY RE-EXECUTING AFTER WAITING FOR PEER PROCESSORS TO COMPLETE PENDING TRANSACTIONS AND BYPASSING THE BUFFER

(75) Inventors: Xiaowei Shen, Beijing (CN); Hua Yong Wang, Beijing (CN); Kun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 12/325,866

(22) Filed: Dec. 1, 2008

(65) Prior Publication Data

US 2009/0144524 A1    Jun. 4, 2009

(30) Foreign Application Priority Data

Nov. 29, 2007 (CN) .......................... 2007 1 0196184

(51) Int. Cl.
*G06F 15/163* (2006.01)
(52) U.S. Cl. ............................. 712/30; 710/52; 711/147
(58) Field of Classification Search .................. None
See application file for complete search history.

(56) References Cited

U.S. PATENT DOCUMENTS

| | | | |
|---|---|---|---|
| 7,350,034 B2 * | 3/2008 | Shen .............................. | 711/145 |
| 7,739,456 B1 * | 6/2010 | Cypher et al. ................ | 711/145 |
| 2005/0060559 A1 | 3/2005 | McKenney | |
| 2005/0086446 A1 | 4/2005 | McKenney et al. | |
| 2006/0085588 A1 | 4/2006 | Rajwar et al. | |
| 2006/0085591 A1 | 4/2006 | Kumar et al. | |
| 2009/0177847 A1 * | 7/2009 | Ceze et al. .................... | 711/152 |
| 2011/0040906 A1 * | 2/2011 | Chung et al. .................... | 710/57 |

OTHER PUBLICATIONS

Sean Lie, Hardware Support for Unbounded Transactional Memory, May 7, 2004, Publisher: MIT, Published in: US.
Colin Blundell, et al., Making the Fast Case Common and the Uncommon Case Simple in Unbounded Transactional Memory, Jun. 9-13, 2007, pp. 24-34, International Symposium on Computer Architecture Proceedings of the 34th Annual International Symposium on Computer Architecture, Published in: San Diego, CA, USA.
C. Scott Ananian, et al., Unbounded Transactional Memory, Feb. 2004, Publisher: MIT, Published in: US.

* cited by examiner

*Primary Examiner* — Kenneth Kim
(74) *Attorney, Agent, or Firm* — Suiter Swantz pc llo

(57) ABSTRACT

There is disclosed a method and apparatus for handling transaction buffer overflow in a multi-processor system as well as a transaction memory system in a multi-processor system. The method comprises the steps of: when overflow occurs in a transaction buffer of one processor, disabling peer processors from entering transactions, and waiting for any processor having a current transaction to complete its current transaction; re-executing the transaction resulting in the transaction buffer overflow without using the transaction buffer; and when the transaction execution is completed, enabling the peer processors for entering transactions.

19 Claims, 6 Drawing Sheets

HANDLING TRANSACTION BUFFER OVERFLOW IN MULTIPROCESSOR BY RE-EXECUTING AFTER WAITING FOR PEER PROCESSORS TO COMPLETE PENDING TRANSACTIONS AND BYPASSING THE BUFFER

CROSS-REFERENCE TO RELATED APPLICATIONS

The present application claims the benefit under 35 U.S.C. §119 of China; Application Serial Number 200710196184.3, filed Nov. 29, 2007 entitled "A Method to Handle Transaction Overflow By Test-And-Disable Instruction," which is incorporated herein by reference.

BACKGROUND

A transaction is a concept widely used in the computer field. A transaction generally refers to the execution of a plurality of instructions in an atomic-like manner, with no other operations intervening during the execution. For example, if a transaction accesses data at a certain memory address, then the data at the address should not be modified by an operation outside the transaction until the transaction completes.

A transaction can be implemented directly at the hardware level, such as by modifying the processor architecture. The hardware component that supports transactions at the architecture level is called a Transactional Memory (TM) system. Using a TM system can improve software productivity because programmers may not need to use locks when writing a concurrent program.

The following example illustrates what a transaction is from the programmers' viewpoint. FIG. 1 shows a dynamic balanced binary tree. The operations performed on the tree include read, write, deletion and insertion. If a plurality of threads access the tree concurrently, then the programmers usually use a global lock to protect the whole tree. This coarse-grained method is simple, but it enforces accesses to the tree to be serialized. So, it cannot have good performance. Fine-grained locks can solve the problem. For example, a lock can be given to each node in the tree. However, in this way, the program will be hard to write. When inserting or deleting a node, the neighboring nodes sometimes have to be rotated to keep tree balance. For correctness, multiple locks have to be acquired. That brings new problems, such as deadlock. Programmers have to master strong skills of parallel programming if the programs have to be written using fine-grained locks. So the productivity is low.

With the help of TM, the dilemma disappears. Programmers simply mark the boundaries of a transaction in the code through the newly defined transaction_start and transaction_end. Inside the transaction, the code is written as in the traditional way without any consideration of locks. The hardware will guarantee that the transaction is executed just like an atomic operation, without any intervening operations. The following exemplary code shows operations, such as insertion or deletion of a node, performed on the dynamic balanced binary tree using the TM.

```
transaction_start {
  a.    p = root;
  while (TRUE) {
  b.    if (x < p->key) {
      i.    p = p->left;
  c.    } else if (x > p->key) {
      i.    p = p->right;
  d.    } else { break; }
  }
  do read/write/deletion/insertion here;
  } transaction_end;
```

FIG. 2 shows a current common TM system. As shown in the figure, at the architecture level, all the data accessed by a transaction (speculative data) will be stored in a transaction buffer temporarily, instead of being written into the memory. If two transactions access a same address and at least one of them modifies the data at the address, then one of them has to roll back and re-execute, while the other one continues. This situation is called conflict. If there is no conflict, the temporarily stored data are written to the memory at the end of the transaction. This action is called commit.

In the above example, if the tree is large, then the probability that two threads modify a same node is quite low. So, it is likely safe to run multiple transactions in parallel. Thus, although a coarse-grained programming style is used when using the TM system, the performance of program execution compares to that using fine-grained locks.

As mentioned above, in order to implement a TM system, an on-chip buffer for temporary storage is required. However, the hardware buffer can only have a limited size. For example, Power4/Power5 has a 32 KB L1 data cache for each processor core. The temporary buffer is on the critical path, so it can hardly be larger than L1 cache (actually, because of area limitation, it should be much smaller than L1 cache). On the other hand, it is difficult for programmers to figure out precisely how much storage space will be used by a transaction. So a possible situation is that the storage space consumed by a transaction is larger than the hardware buffer size. This situation is called overflow.

In order to guarantee the correctness of a program, the overflow must be handled. Since overflow is a rare event, the method to handle overflow is not speed critical for overall performance, while the hardware complexity for implementation should be kept as minimal as possible.

A solution for handling overflow through hardware is disclosed in Rajwar R, Herlihy M, Lai K. Virtualizing transactional memory, Proceedings of the 32nd Annual International Symposium on Computer Architecture (ISCA), Madison, Wis.: IEEE Computer Society, 2005, 494-505. The solution is provided by Intel. It avoids overflow by storing the speculative data into the memory. However, this method needs to add some new components to support automatic storage, and involves complex modifications to hardware. The IBM Power architecture adopts the RISC architecture, which requires the hardware to be simple. So, the above solution is not suitable for IBM products and all chips that adopt the RISC architecture.

Another method for avoiding overflow by writing speculative data into the memory is disclosed in Moore K E, Bobba J, Moravan M J, Hill M D, Wood D A. Log™: Log-based transactional memory, the 12th International Symposium on High-Performance Computer Architecture(HPCA), 2006, 254-265. However, compared to the disclosed log-based method, the conflict detection in a cache or a hardware buffer is much faster. So the log-based method disclosed in the document is not ideal in conflict detection.

A method for handling the transaction buffer overflow is also disclosed in Colin Blundell, Joe Devietti, E Christopher Lewis and et al., Making the Fast Case Common and the Uncommon Case Simple in Unbounded Transactional Memory, Proceedings of Annual International Symposium on Computer Architecture (ISCA), 2007. However, this method still needs complex hardware modifications, such as modifications to the storage controller.

Obviously, a simple and efficient solution to handle buffer overflow, with minimal modification to existing hardware architecture is necessary.

SUMMARY OF INVENTION

According to an aspect of the present invention, there is provided a method for handling transaction buffer overflow in a multi-processor system, comprising the steps of: when overflow occurs in a transaction buffer of a processor, disabling peer processors from entering transactions, and waiting for any processor having a current transaction to complete its current transaction; re-executing the transaction resulting in the transaction buffer overflow without using the transaction buffer; and when the transaction execution is completed, enabling the peer processors for entering transactions.

According to another aspect of the present invention, there is provided a transaction buffer system in a multi-processor system, comprising: a plurality of processors; a memory accessible by the plurality of processors; and a transaction buffer of each processor, wherein when overflow occurs in a transaction buffer of a processor, the processor disables peer processors from entering transactions, waits for any processor having a current transaction in the peer processors to complete the current transaction, then re-execute the transaction resulting in the transaction buffer overflow; and when the re-execution of the transaction resulting in the transaction buffer overflow has been completed, the peer processors are enabled for entering transactions.

According to a further aspect of the present invention, there is provided a method for one process to modify peer processors' status, the method comprising the steps of: sending by the processor a message to each of the one or more peer processors through a bus; receiving, by each of the one or more peer processors, the message, and modifying the its register based on the message; and returning a response by each of the one or more peer processors.

The solution of the present invention can solve the problem of transaction buffer overflow, and at the same time it only needs little modification at hardware level. So it is particularly suitable for an RISC chip.

BRIEF INTRODUCTION TO DRAWINGS

The invention itself and its preferred embodiments, additional objects and advantages can be best understood from the following detailed description of the illustrative embodiments when read in conjunction with the drawings, in which.

BEST MODES FOR CARRYING OUT INVENTION

The embodiments of the present invention will be explained hereinafter. However it should be understood that the present invention is not limited to the specific embodiments described herein. On the contrary, it is contemplated to implement or practice the present invention using any combination of the following features and elements, regardless of whether they involve different embodiments. Therefore, the following aspects, features, embodiments and advantages are only used for illustration and should not be regarded as the elements or definitions of the attached claims, unless indicated explicitly in the claims.

The basic idea of the present invention consists in that, when TM overflow occurs, software is informed to handle it. The transaction should be aborted and re-executed. When it is executed the second time, the hardware does not store the speculative data into the temporary buffer, instead it writes the data into the memory. Since the temporary buffer is not used, no overflow will happen during the execution of the transaction the second time. However, in order to keep correctness, there must be a mechanism to prevent other transactions to access the same data. A new instruction "test-and-disable" broadcasts a message on the bus and disable peer processors from entering new transactions. When peer processors exit their current transactions (if any), the overflowed transaction begins the second time execution. Since now it is the only transaction in the system, it can directly write the data to the memory safely.

The technical solution of the present invention will be described in general below by taking an exemplary implementation of the present invention on the Power architecture as an example. However, it should be noted that this is not a limitation to the present invention. Instead, the present invention can be implemented on any other RISC architecture or in multi-processor systems adopting other architectures.

Figure 1:
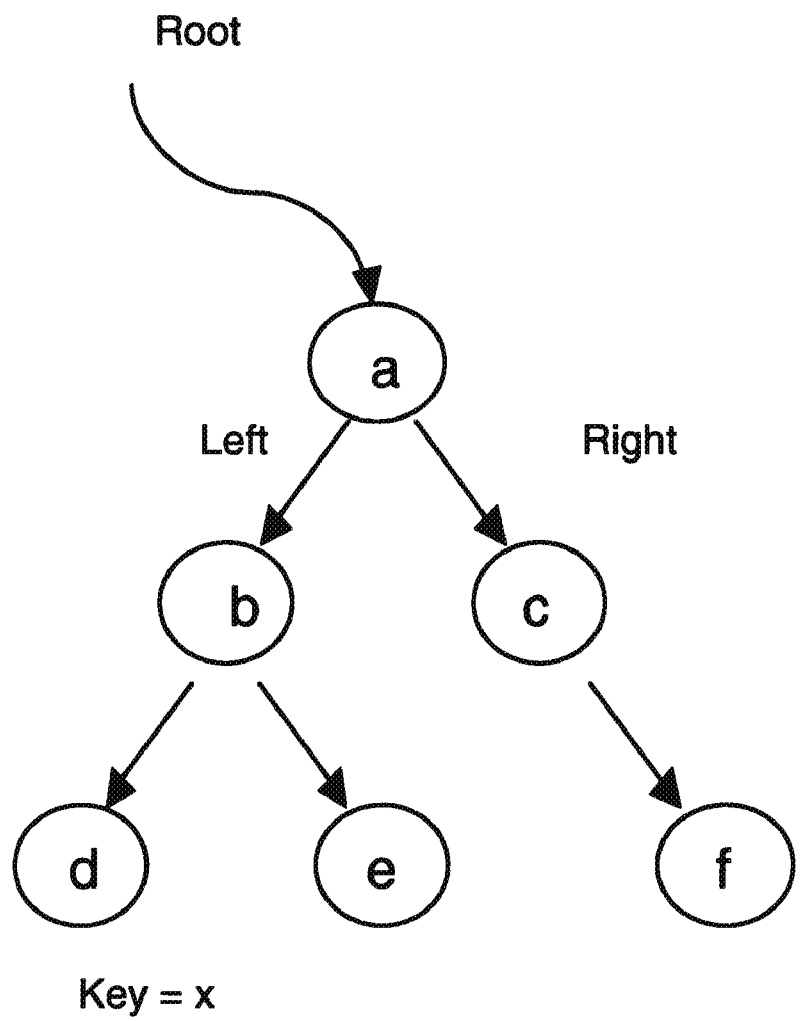
FIG. 1 shows an exemplary dynamic balanced binary tree on which operations can be performed using TM.
Figure 2:
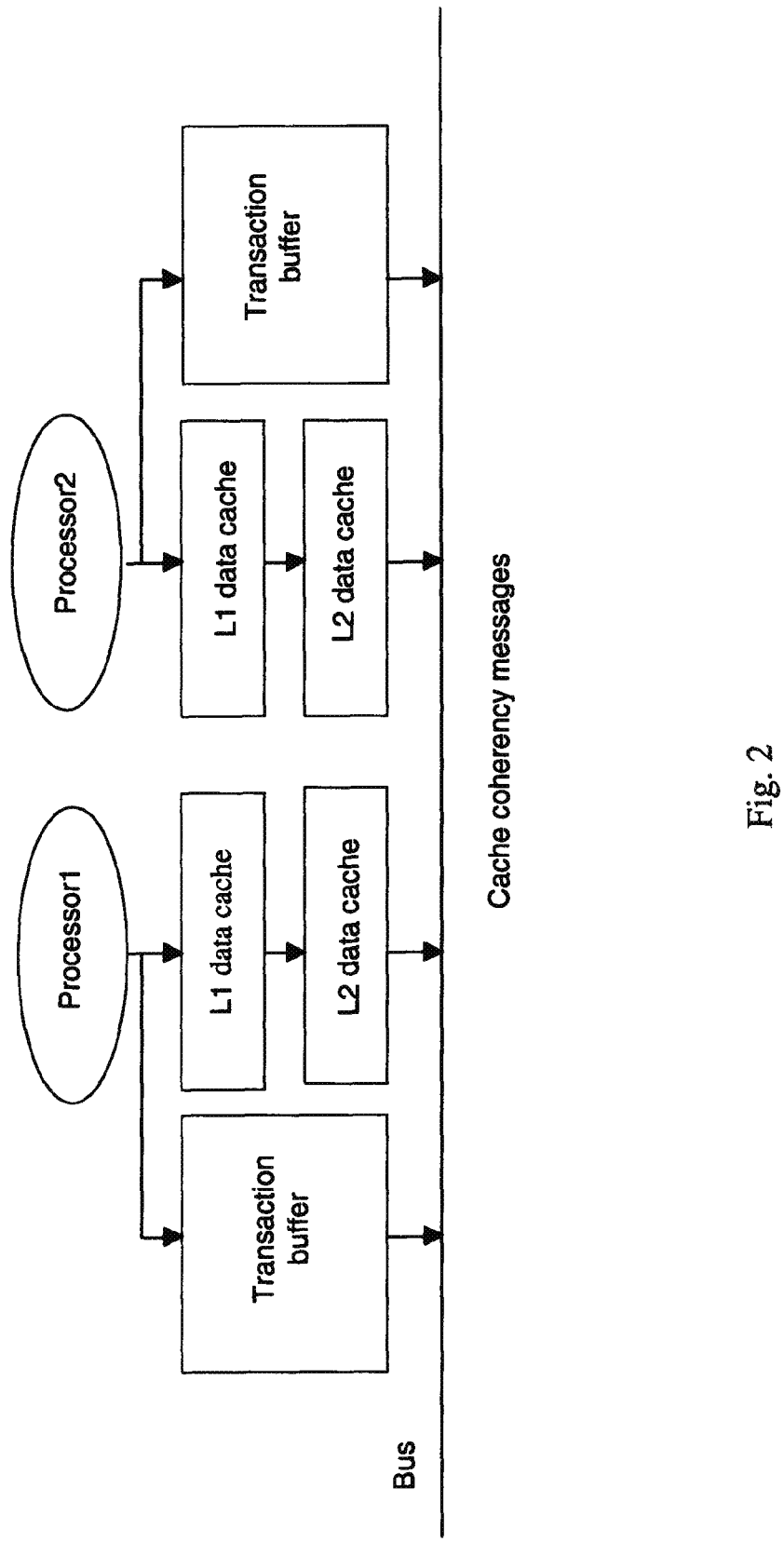
FIG. 2 shows a current common TM system.
Figure 3:
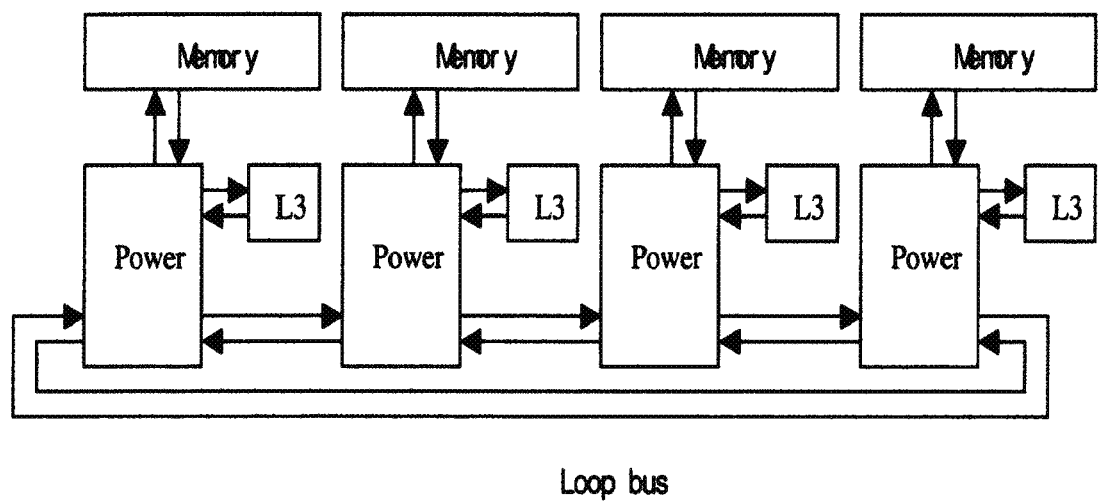
FIG. 3 shows the chip interconnection structure in the Power architecture.

FIG. 3 shows the interconnection manner of chips in the Power architecture, where a ring is used to connect 4 chips to form an MCM (multi-chip module). Actually, it is the L2 cache (inside the Power chip in the figure, and not shown) in each chip that participates in the connection.

Figure 4:
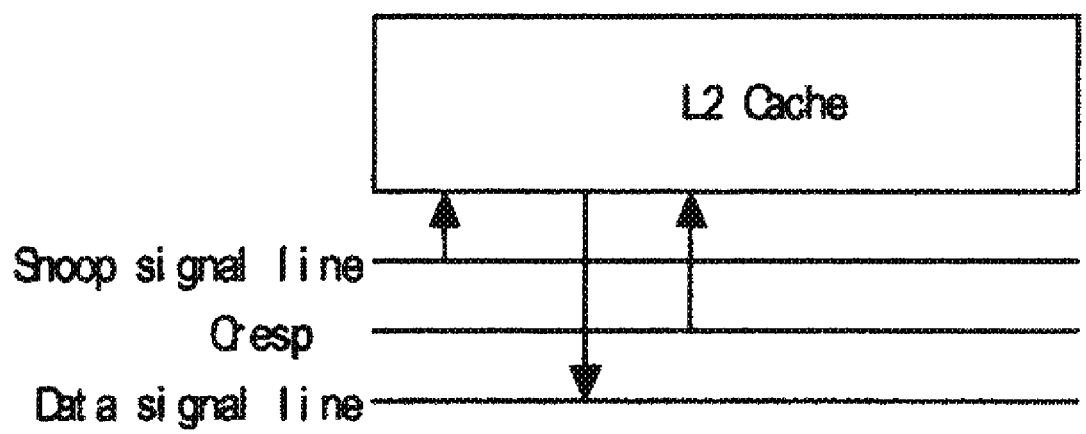
FIG. 4 shows the structure of a Power L2 cache.

FIG. 4 shows the structure of the Power L2 cache.

A ring bus is usually used for transferring cache coherency protocol messages. The messages are transferred on the ring bus, and received by the L2 caches of peer processors through their snoop ports. The L2 caches of the peer processors generate responses, which are combined into one final response (combined response, abbreviated as cresp). Every L2 cache can get cresp from a cresp port.

Utilizing the above structure, the present invention can be implemented without substantial hardware modifications. There can be added in the L2 cache of each processor two flags reflecting its status: TE (transaction-enable) indicates whether a processor can enter a transaction; and TP (transaction-in-progress) indicates whether a processor is currently in a transaction. When TM overflow happens on a processor, the processor broadcasts a message to peer processors on the ring bus by executing a "Check-&-Disable" instruction. Each processor can receive the message through its snoop port, and set its TE flag based on the message, thus disabling the processor from entering a new transaction. Meantime, the TP flag is read from the L2 cache of each processor and sent on the ring bus in response to the message. These responses are merged together based on the semantics of the "Check-&-Disable" instruction. The final value generated by merging the TPs will be returned to the processor. The processor determines, based on the value, whether there exists another processor in a transaction currently, and when any other processor is in a transaction currently, re-executes the "Check-&-Disable" instruction, until all the peer processors exit their current transactions, so that the processor can re-execute its transaction which has generated the buffer overflow in the memory directly without using the transaction buffer.

In the modified hardware architecture, several new instructions are added. These instructions and their semantics are listed below:

```
1) Transaction -Start handler
Semantics:
    if(TE==1)
        TP=1;
        begin executing a transaction;
    else
        go to handler;
2) Transaction-End
Semantics:
    commit all data written by the transaction to the memory;
    TP = 0
3) Transaction-Enable
Description:
    enable each peer processor for entering a new transaction
Semantics:
    TE[k] = 1 for each peer processor k
4) Transaction-Disable
Description:
    disable each peer processor from entering a new transaction
Semantics:
    TE[k] = 0 for each peer processor k
5) Transaction-Check    result-register
Description:
    check whether any peer processor is in a transaction
Semantics:
    result-register = 1 if and only if TP[k] == 1 for a peer processor k
6) Transaction-Check-&-Disable result-register
Semantics:
    execute the following two instructions in an atomic way:
    Transaction-Check result-register
    Transaction-Disable
7) Get-TP    result-register
Semantics:
    result-register = TP
8) Set-TP
Description:
    set TP to 1 to indicate the processor itself is in a transaction
Semantics:
    TP = 1
9) Clear-TP
Description:
    clear TP to 0 to indicate the processor itself is not in a transaction
Semantics:
    TP = 0
10) Get-TE    result-register
Semantics:
    result-register = TE
11) Set-TE
Description:
    set TE to enable the processor itself for executing a transaction
Semantics:
    TE = 1
12) Clear-TE
Description:
    clear TE to disable the processor itself from executing a transaction
Semantics:
    TE = 0
```

In the following, by taking a transaction and an exemplary code of its handler as an example, it will be described how to process TM overflow using the above instructions in the technical solution of the present invention. It should be noted that the following code is only an illustration instead of limitation to the present invention.

```
1   Save register;     //save registers in case the transaction is aborted and re-executed
2   transaction-start:
3       Recover register;  //recover registers for re-execution
4       Transaction-Start handler-address;   //the transaction starts
5       ...                                  //the transaction is executed
6       Transaction-End;                     //the transaction ends
7   transaction-succeed:
8       ...
9
10  handler-address                //entry point of the handler
11      ...
12  transaction-check:             //the code for handling overflow begins here
13      Transaction-Check result-register //check whether a processor is in a transaction
14      if(result-register==1)
15          go to transaction-check;   //if a processor is in a transaction, check again
16      Set-TP;                    //indicate the processor itself is in a transaction
17  transaction-check-&-disable:
18      Transaction-Check-&-Disable result-register//disable peer processors from executing transactions
19      if(result-register ==1)      //check whether a peer processor is in a transaction
20          go to transaction-check-&-disable//if a processor is in a transaction, check again
21      ...                          //re-execute the transaction again (maybe with global lock of memory)
22      Transaction-Enable; //enable peer processors for executing transactions
23      Clear-TP;          //indicate the processor itself is not in a transaction
```

```
24      go to transaction-succeed;
```

According to the above code, if overflow occurs in the transaction buffer of a processor, the execution flow jumps to the handler (line 10). Because it is an overflow event, it further jumps to line 12. The handler waits for other transactions to be completed (lines 13-15). Then the TP of the processor itself is set (line 16) and all peer processors are disabled from entering new transactions (lines 18-20). Afterwards, it re-executes the transaction without temporary buffering (line 21). In this stage, a global lock or other software mechanism can be used to guarantee correctness if necessary. Finally, peer processors are enabled for executing transactions (line 22), and the TP flag of the processor itself is cleared (line 23).

The key point in the above code is the "Check-&-Disable" instruction. Its several following unique features distinguish the TM system of the present invention from other TM systems: 1) it explicitly makes use of message broadcasting on a bus; 2) it tests and modifies registers in peer processors; and 3) it explicitly makes use of the response combination mechanism in the Power architecture to generate a return value.

The technical solution of the present invention has been described above in general by taking an exemplary implementation of the present invention on the Power architecture as an example. It should be noted that the above description is only an illustration instead of limitation to the present invention. For example, the present invention can also be implemented in other multi-processor system having an RISC architecture or non-RISC architecture. The multi-processor system capable of implementing the present invention can be any kind of multi-processor system, including a closely coupled multi-processor system in which a plurality of CPUs are connected to each other at the bus level as described above or even a plurality of processors are on a single chip; a loosely coupled multi-processor system in which a plurality of separate computers are interconnected through a high speed communications system (such as a Gigabit Ethernet); as well as a symmetric multi-processor system and an asymmetric multi-processor system. Correspondingly, processors therein refer to any computing entities, including multiple cores in a signal chip, multiple processing chips in a single package, multiple packages in a single system unit, multiple separate computers interconnected through a network, etc. For another example, the above described TE, TP flags can be located either in an L2 cache, or in the processor itself; and they can be implemented using either existing registers or other storage elements or bits therein, or newly added registers or other storage elements or bits therein. Further, the "Check-&-Disable" instruction and other instructions can be executed either by an L2 cache or by the processor itself. In addition, that a processor sets and reads the statuses of peer processors can be implemented either by sending a message on a bus, or by sending a message on other communications structures, or in other ways.

A TM system in a multi-processor system according to an embodiment of the present invention and a method and apparatus for handling overflow of a transaction buffer according to an embodiment of the present invention will be described below with reference to the drawings.

Figure 5:
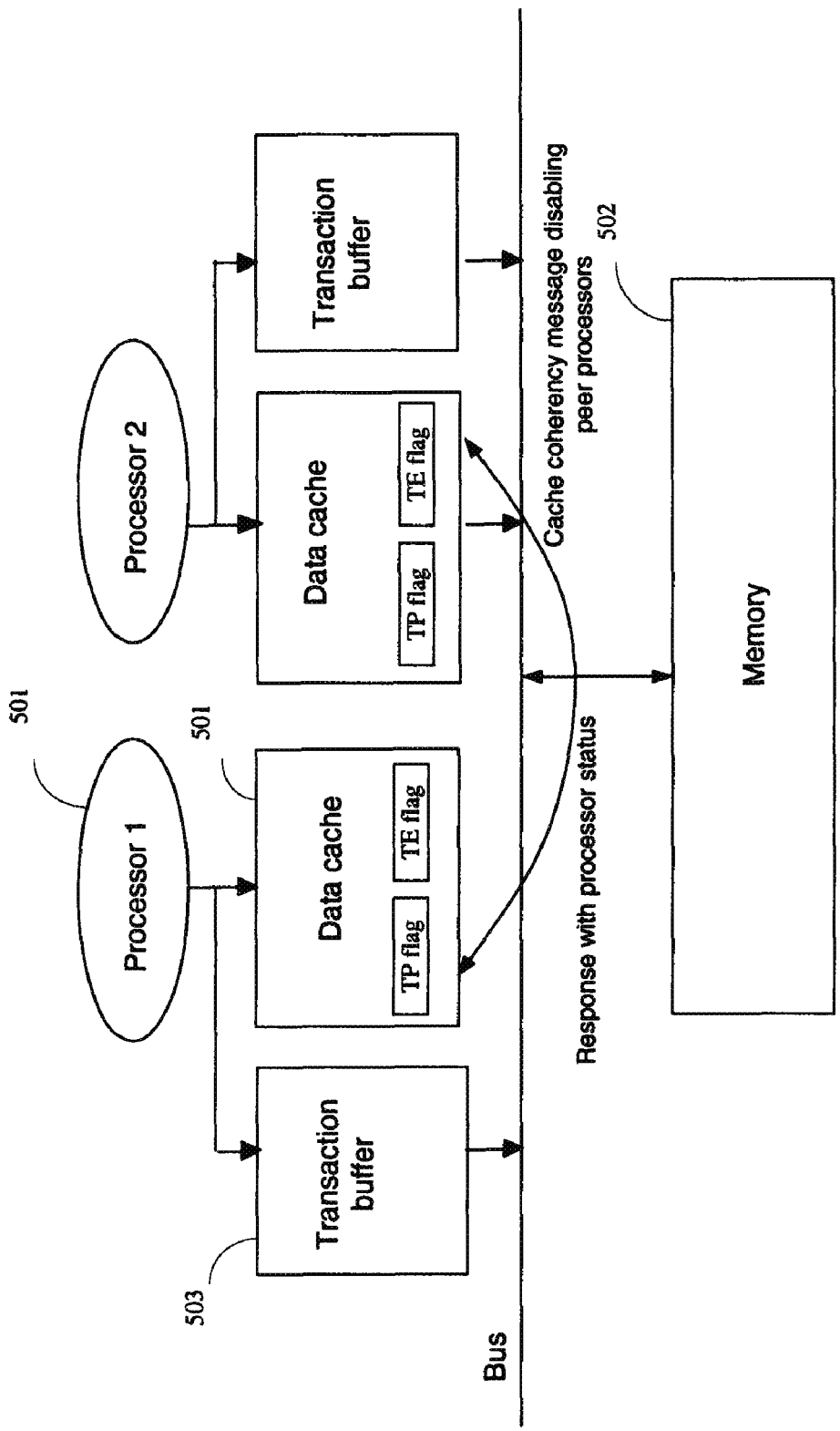
FIG. 5 shows a TM system in a multi-processor system according to an embodiment of the present invention.

FIG. 5 shows a TM system in a multi-processor system according to an embodiment of the present invention. As shown in the figure, the TM system comprises a plurality of processors 501 (for brevity, only two are shown in the figure); a memory 502 accessible by the plurality of processors; and a transaction buffer 503 of each processor.

If a transaction buffer 503 of a processor 501 has overflow when the processor 501 is executing a transaction, the processor 501 can disable the peer processors 501 from entering transactions, and wait for any processor 501 having a current transaction to complete its current transaction. After all processors 501 having current transactions have completed their current transactions, the processor 501 can re-execute the transaction resulting in the transaction buffer overflow 503, and during the re-execution of the transaction, the processor 501 will no longer use the transaction buffer 503, but execute the operations in the transaction in the memory 502 directly (e.g., through a data cache). Since the peer processors 501 are disabled from entering new transactions at this time, the transaction will be the unique transaction in the whole multi-processor system, thus avoiding a conflict possibly caused in the multi-processor system due to different processors 501 accessing a same memory address in different transactions. In addition, in the re-execution of the transaction, a global lock or other mechanism may also be used to further guarantee correctness. When the transaction execution is completed, the processor 501 re-enables peer processors 501 for entering transactions.

In an embodiment of the present invention, if a processor 501 has transaction buffer overflow when it is executing a transaction, the processor 501 sends a "Check-&-Disable" message to all the peer processors 501 in the multi-processor system. When each of the peer processors 501 receives the "Check-&-Disable" message, it checks whether the processor 501 has a transaction being executed currently, returns the checking result and disables the respective processor from entering a new transaction. When the checking result returned from each of the peer processors 501 indicates any processor 501 is executing a transaction currently, the processors 501 send again the "Check-&-Disable" message, until the checking result returned from each of the peer processors 501 indicates that the processor 501 has no transaction being executed.

For example, in an embodiment of the present invention, when a processor 501 in the multi-processor system has transaction buffer overflow, the processor 501 can send the "Check-&-Disable" message to the peer processors in the multi-processor system by executing the Transaction-Check-&-Disable instruction described above, so as to check whether any peer processors are executing transactions currently, and disable the peer processors from entering new transactions. Moreover, when the execution result of the instruction shows there exists any other processor which has a current transaction being executed, the processor can execute the instruction again, until the execution result of the instruction shows the execution of any current transaction of any peer processors is completed.

In an embodiment of the present invention, each processor 501 in the multi-processor system has a TP flag. The flag indicates whether the processor 501 is executing a transaction currently. For example, the flag may contain a binary bit. When the bit is 1, it indicates the processor 501 is currently executing a transaction, and when the bit is 0, it indicates the processor 501 is not currently executing a transaction. Of course, the flag can also contain a plurality of bits, and a different binary number can be used to indicate whether the processor 501 is executing a transaction. In an embodiment of the present invention, the flag is in a data cache (such as L2 data cache) of the processor 501. In another embodiment of the present invention, the flag can also be in the processor 501 itself. The flag can be implemented by either an existing element in the data cache or the processor 501 itself, or a newly added element.

When a processor 501 enters a transaction, it sets its TP flag (for example, the flag is set by executing the Set-TP instruction described above), and when a processor 501 completes a transaction, it clears its TP flag (for example, the flag is cleared by executing the Clear-TP instruction described above). Thus, when a processor 501 receives a "Check-&-Disable" message from another processor 501, it can check if it is executing a transaction by reading the TP flag therein (such as by executing the Get-TP instruction described above), and return the result to the other processor 501.

In an embodiment of the present invention, each processor 501 in the multi-processor system further has a TE flag. The flag indicates whether the processor 501 can enter a transaction. For example, the flag may contain a binary bit. When the bit is 1, it indicates the processor 501 can enter a transaction; and when the bit is 0, it indicates the processor 501 can not enter a transaction. Of course, the flag can also contain a plurality of bits, and a different binary number can be used to indicate whether the processor 501 can enter a transaction. In an embodiment of the present invention, the flag is in a data cache of the processor 501. In other embodiments of the present invention, the flag can be in the processor 501 itself. The flag can be implemented by either an existing element in the data cache or the processor 501 itself, or a newly added element.

Each processor 501 first checks the TE flag whenever it enters into a transaction, and only when the TE flag is set (e.g., the flag is 1), it enters the transaction; and when the TE flag is not set (e.g., the flag is 0), the processor 501 can not enter the transaction, but instead executes a hander, for example. Thus, when a processor 501 receives the "Check-&-Disable" message from another processor 501, it can disable itself from entering a new transaction by clearing the TE flag (e.g., by executing the Clear-TE instruction described above).

In an embodiment of the present invention, after the transaction resulting in transaction buffer overflow on a processor 501 is re-executed and completed without using the transaction buffer, the processor 501 enables each of the peer processors 501 for entering transactions by sending a transaction enable message to each of the peer processors 501 in the multi-processor system. In a further embodiment of the present invention, when a processor 501 receives the transaction enable message from another processor 501, the processor 501 can enable itself for entering a new transaction by setting the TE flag therein (e.g., by executing the Set-TE instruction described above).

In a preferred embodiment of the present invention, when the transaction buffer 503 of a processor 501 has overflow, the processor 501 executes a handler, and performs the above operations in the handler. The handler is preferably implemented by software code loaded into the memory 502 and accessible by the processor 501, but can also be implemented by firmware or hardware in the processor 501 or other components.

In an embodiment of the present invention, as further performance optimization, when a processor 501 has transaction buffer overflow, instead of disabling all the peer processors 501 in the multi-processor system from entering transactions, the processor 501 only disables some of the peer processors 501 from entering transactions, or only disables the peer processors from entering transactions possibly conflicting with the current transactions, or both.

In an embodiment of the present invention, the plurality of processors 501 in the multi-processor system is interconnected through a bus. Thus the "Check-&-Disable" message and the transaction enable message can be sent to each of the peer processors 501 through message broadcasting on the bus, and the response of each processor 501 can be returned to the processor 501 through the bus. In a further embodiment of the present invention, the multi-processor system has the Power architecture, for example, and can generate a return value from the responses of the peer processors 501 using the response merging mechanism in the Power architecture, and return it to the processor 501.

Figure 6:
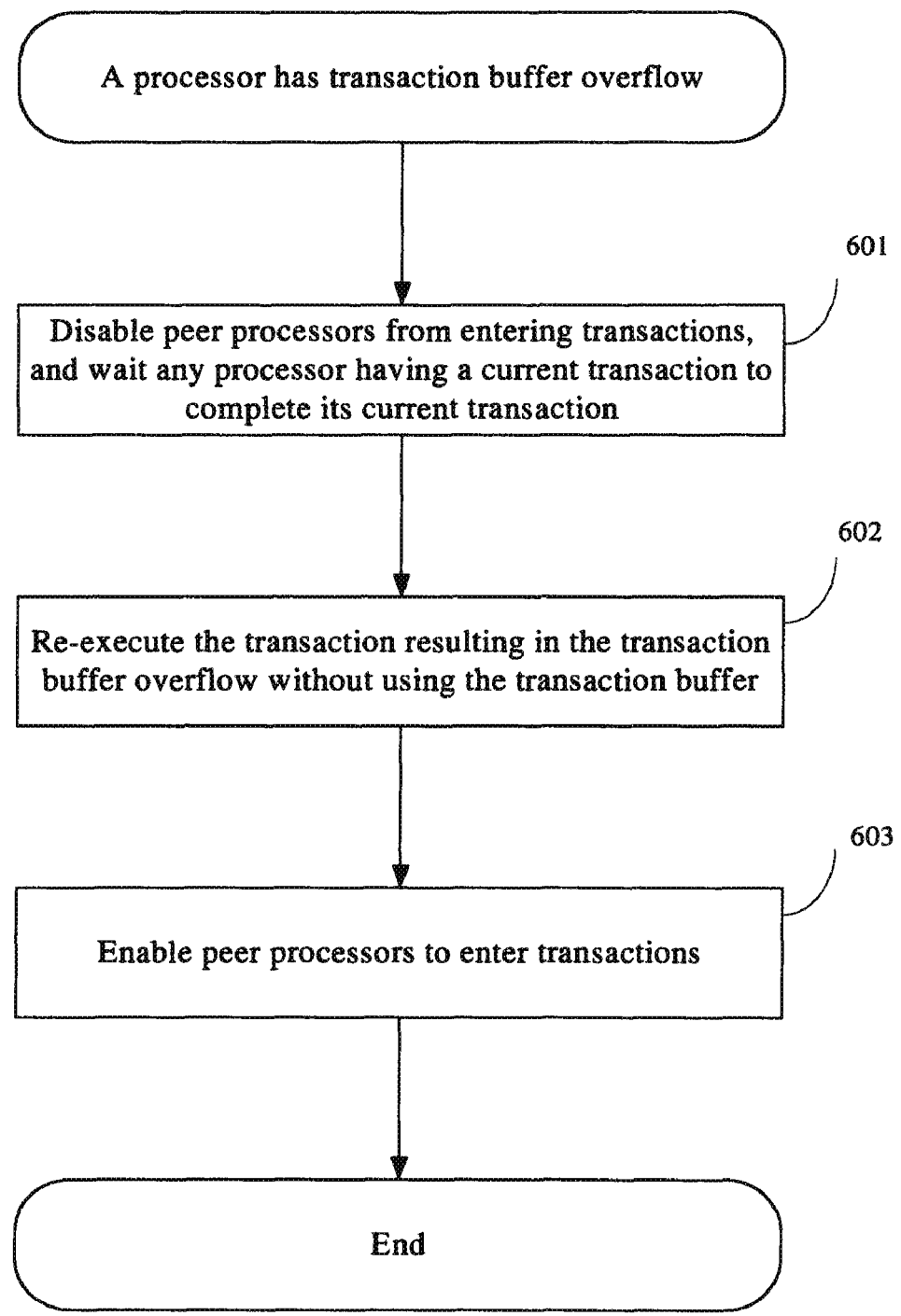
FIG. 6 shows a method for handling transaction buffer overflow according to an embodiment of the present invention in a multi-processor system.

FIG. 6 shows a method for handling transaction buffer overflow according to an embodiment of the present invention in a multi-processor system.

As shown in the figure, the process begins when the transaction buffer 503 of a processor has overflow. At step 601, the peer processors in the multi-processor system are disabled from entering transactions, and the process waits for any processors having current transactions to complete their current transactions.

In an embodiment of the present invention, the step 601 comprises the following sub-steps: sending a "Check-&-Disable" message to each of the peer processors by the processor having transaction buffer overflow; when each of the peer processors receives the "Check-&-Disable" message, checking whether the processor is executing a transaction, returning the checking result and disabling the processor from entering a new transaction; and when the checking result returned from any of the peer processors indicates the processor is executing a transaction, sending the "Check-&-Disable" message again by the processor having transaction buffer overflow, until the checking result returned from each of the peer processors indicates that the processor does not have a transaction being executed.

In an embodiment of the present invention, as further performance optimization, when a processor has transaction buffer overflow, the processor does not disable all the peer processors in the multi-processor system from entering transactions, instead it only disables some of the peer processors 501 from entering transactions, or disables the peer processors from entering transactions possibly conflicting with the current transaction, or both.

In an embodiment of the present invention, each processor in the processor system has a TP flag, which indicates whether the processor has a current transaction being executed. Thus when each of the peer processors receives the "Check-&-Disable" message, the processor determines whether it is executing a transaction by reading its TP flag. When a processor in the multi-processor system enters a transaction, the TP flag is set, and when it completes the transaction, the TP flag is cleared. The TP flag can be in the data cache of each processor, or in each processor itself.

In an embodiment of the present invention, each processor in the processor system further has a TE flag, which indicates whether the processor can enter a transaction. Thus when each of the peer processors receives the "Check-&-Disable" message, the processor disables itself from entering a transaction by clearing the TE flag therein. Moreover, each processor in the multi-processor system first checks its TE flag before entering a transaction, and enters the transaction only when the TE flag is set; and the processor does not enter the transaction when the TE flag is not set, but instead executes a handler, for example. The TE flag can be in a data cache of each processor, or in the processor itself.

After each processor in the multi-processor system is disabled from entering a new transaction and any processor having a current transaction has completed its current transaction at step 601, the transaction resulting in the transaction buffer overflow is re-executed without using transaction buffer at step 602. Since all peer processors in the multi-processor system have been disabled from entering transactions, the re-executed transaction will be the only transaction in the multi-processor system. Thus, the operations in the re-executed transaction can be executed directly in the memory (e.g., through a data cache) without using the transaction buffer.

At step 603, after the re-execution of the transaction is completed, the peer processors are enabled for entering transactions. In an embodiment of the present invention, this step comprises the following sub-steps: sending a transaction enable message to each of the peer processors in the multi-processor system by the processor having a transaction buffer overflow; and when each of the processors receives the transaction enable message, the TE flag in the processor is set, so that the processor can enter a transaction.

Preferably, when a processor in the multi-processor system has transaction buffer overflow, the processor starts to execute a handler, and performs the above steps in the handler.

In an embodiment of the present invention, a plurality of processors in the multi-processor system are interconnected through a bus, and the "Check-&-Disable" message and the transaction enable message are sent through message broadcasting on the bus, and the response of each processor can be returned to the processor having transaction buffer overflow via the bus. In a further embodiment of the present invention, the multi-processor system has, for example, the Power architecture, a return value can be generated from the responses of the peer processors by using the response merging mechanism in the Power architecture, and returned to the processor having transaction buffer overflow.

The present invention further provides an apparatus for handling transaction buffer overflow in a multi-processor system. The functional modules in the apparatus executes corresponding steps in the above method for handling transaction buffer overflow in a multi-processor system according to an embodiment of the present invention, and are preferably implemented by computer software in combination with general computer hardware components as well as hardware components in the transaction memory system in the multi-processor system according to an embodiment of the present invention as described above.

In the foregoing, a method and apparatus for handling transaction buffer overflow in a multi-processor system and a transaction memory system in a multi-processor system according to embodiments of the present invention have been described. It can be known from the above description that the core technique of the present invention is a mechanism by which a processor modifies the statuses of peer processors and a "Check-&-Disable" instruction designed for implementing the mechanism. In fact, the mechanism and the "Check-&-Disable" instruction of the present invention can not only be used for handling transaction buffer overflow in a multi-processor system, but also be suitable in other occasions for implementing atomic access to or protection of shared data. For example, when accessing certain global data, it is safe to first disable others from accessing and then access by itself. This way is different from the traditional lock mechanism, since locks in the lock mechanism are located in the memory while what the present invention modifies is a register. This scheme can be applied in database, Web service, or multimedia applications.

It should be noted that, in different embodiments, the "Check-&-Disable" instruction may have different names and may also have more complex semantics. But it should be emphasized that, 1) as long as any other instruction contains the semantics of the "Check-&-Disable" instruction, it should be included in the scope of the present invention, no matter how many extra semantics are added; 2) even if the semantics of the "Check-&-Disable" instruction in the present description are performed using a plurality of instructions instead of using one instruction as described in the present description, it should also be included in the scope of the present invention. In summary, in a multi-processor environment, if only the action occurs that a processor sends a message to peer processors through a bus and thus modifies the statuses of the peer processors, it should be included in the scope of the present invention.

While the present invention has been illustrated and described specifically with reference to preferred embodiments, a person skilled in the art should understand that various changes in form and detail can be made thereto without departing from the spirit and scope of the present invention.

The invention claimed is:

1. A method for handling transaction buffer overflow in a multi-processor system, wherein the multi-processor system includes a first processor, a first transaction buffer associated with the first processor, and at least one peer processor, the method comprising:
    receiving a first transaction, wherein an execution of the first transaction by utilizing the first transaction buffer for storage required to execute the first transaction results in a transaction buffer overflow, said transaction buffer overflow occurring when the execution of the first transaction by utilizing the first transaction buffer consumes an amount of storage in excess of a storage capacity of the first transaction buffer;
    disabling one or more of the at least one peer processor from beginning execution of new transactions to prevent a conflict of different processors accessing or modifying a same memory address in different transactions;
    waiting for the one or more of the at least one peer processor to complete execution of pending transactions, wherein the pending transactions include any transactions being executed by the one or more of the at least one peer processor during or after performance of the step of disabling;
    executing the first transaction by bypassing the first transaction buffer and utilizing a storage device for storage required to execute the first transaction, wherein the step of executing is performed after the step of waiting; and
    enabling each of the one or more of the at least one peer processor.

2. The method of claim 1, wherein the method further includes:
    sending a "Check-&-Disable" message to the one or more of the at least one peer processor; and
    receiving a check result from each of the one or more of the at least one peer processor, wherein the check result includes a transaction-in-progress indicator for indicating whether a particular peer processor has a pending transaction.

3. The method of claim 2, wherein the method further includes:
    receiving one or more subsequent check results from any peer processor that previously sent a most recent check result indicating that a particular peer processor had a pending transaction, until a most recent subsequent check result indicates that a particular peer processor does not have a pending transaction.

4. The method of claim 2, wherein each processor of the multi-processor system has a first flag, said first flag being set when the processor in the multi-processor system enters a transaction, said first flag being cleared when the transaction is complete, and the step of waiting further including:
checking the first flag of each of the one or more of the at least one peer processor to determine whether a particular peer processor has a pending transaction.

5. The method of claim 4, wherein each processor of the multi-processor system has a second flag, said second flag being set when a particular processor is enabled, said second flag being cleared when the particular processor is disabled, wherein the particular processor checks the second flag before entering a transaction and enters a new transaction only when the second flag is set, and the step of disabling further including:
clearing the second flag in each of the one or more of the at least one peer processor.

6. The method of claim 5, wherein the step of enabling includes:
transmitting a transaction enable message to each of the one or more of the at least one peer processor, wherein each of the one or more of the at least one peer processor sets said peer processor's second flag after receiving the transaction enable message.

7. The method of claim 1, wherein the storage device utilized in the step of executing comprises memory.

8. The method of claim 1, wherein the step of disabling comprises disabling only peer processors that have a possibility of causing a conflict of different processors accessing or modifying a same memory address in different transactions.

9. The method of claim 5, wherein the first flag and the second flag are in a data cache of each processor of the multi-processor system.

10. The method of claim 6, wherein processors of the multi-processor system are interconnected through a bus, and the "Check-&-Disable" message and the transaction enable message are sent through message broadcasting on the bus.

11. A transaction buffer system for handling transaction buffer overflow in a multi-processor system, comprising:
a plurality of processors, the plurality of processors at least including a first processor and at least one peer processor;
a first transaction buffer, wherein the first transaction buffer is associated with the first processor; and
the first processor, wherein the first processor is at least configured to:
receive a first transaction, wherein an execution of the first transaction by utilizing the first transaction buffer for storage required to execute the first transaction results in a transaction buffer overflow, said transaction buffer overflow occurring when the execution of the first transaction by utilizing the first transaction buffer consumes an amount of storage in excess of a storage capacity of the first transaction buffer;
disable one or more of the at least one peer processor from beginning execution of new transactions to prevent a conflict of different processors accessing or modifying a same memory address in different transactions;
wait for the one or more of the at least one peer processor to complete execution of pending transactions, wherein the pending transactions include any transactions being executed by the one or more of the at least one peer processor;
execute the first transaction by bypassing the first transaction buffer and utilizing a storage device for storage required to execute the first transaction; and
enable each of one or more of the at least one peer processor.

12. The system of claim 11, wherein the first processor is further configured to:
send a "Check-&-Disable" message to one or more of the at least one peer processor; and
receive a check result from each of the one or more of the at least one peer processor, wherein the check result includes a transaction-in-progress indicator for indicating whether a particular peer processor has a pending transaction.

13. The system of claim 12, wherein the first processor is further configured to:
receive one or more subsequent check results from any peer processor that previously sent a most recent check result indicating that the particular peer processor had a pending transaction, until a most recent subsequent check result indicates that the particular peer processor does not have a pending transaction.

14. The system of claim 12, wherein each processor of the multi-processor system has a first flag, said first flag being set when the processor in the multi-processor system enters a transaction, said first flag being cleared when the transaction is complete, and the first processor further configured to:
check the first flag of each of the one or more of the at least one peer processor to determine whether the particular peer processor has a pending transaction.

15. The system of claim 14, wherein each processor of the multi-processor system has a second flag, said second flag being set when the particular processor is enabled, said second flag being cleared when the particular processor is disabled, wherein the particular processor checks the second flag before entering a transaction and enters a new transaction only when the second flag is set, and the first processor further configured to:
clear the second flag in each of the one or more of the at least one peer processor.

16. The system of claim 15, wherein the first processor is further configured to:
transmit a transaction enable message to each of the one or more of the at least one peer processor, wherein each of the one or more of the at least one peer processor sets said peer processor's second flag after receiving the transaction enable message.

17. The system of claim 11, wherein the storage device, that the first processor utilizes in being configured to execute, comprises memory.

18. The system according to claims 15, wherein the first flag and the second flag are in a data cache of each processor of the multi-processor system.

19. The system according to claim 16, wherein processors of the multi-processor system are interconnected through a bus, and the "Check-&-Disable" message and the transaction enable message are sent through message broadcasting on the bus.

* * * * *